(12) United States Patent
Alini et al.

(10) Patent No.: US 6,512,649 B1
(45) Date of Patent: Jan. 28, 2003

(54) METHOD FOR DIFFERENTIALLY WRITING TO A MEMORY DISK

(75) Inventors: Roberto Alini, Pleasonton, CA (US); Quocdzung T. Lam, San Jose, CA (US); Xiaokun Liu Chew, San Jose, CA (US); Mark McCornack, Los Gatos, CA (US); David Joseph Bezinque, Felton, CA (US); Tehri Lee, San Jose, CA (US); Su Dang Le, San Jose, CA (US); Axel Alegre de La Soujeole, Scotts Valley, CA (US); Gilles Denoyer, Campbell, CA (US)

(73) Assignees: STMicroelectronics, Inc., Carrollton, TX (US); Maxtor Corporation, Longmont, CO (US)

( * ) Notice: Subject to any disclaimer, the term of this patent is extended or adjusted under 35 U.S.C. 154(b) by 0 days.

(21) Appl. No.: 09/651,830

(22) Filed: Aug. 30, 2000

(51) Int. Cl.$^7$ .................................................. G11B 5/02
(52) U.S. Cl. ........................................ 360/68; 327/110
(58) Field of Search ................................ 360/317, 318, 360/323, 68, 67, 46, 61, 62; 327/108, 110, 111, 309, 310, 311, 551

(56) References Cited

U.S. PATENT DOCUMENTS

| | | | |
|---|---|---|---|
| 4,551,772 A | * 11/1985 | Sliger | 360/46 |
| 4,937,802 A | 6/1990 | Omori et al. | |
| 5,041,773 A | 8/1991 | Takahashi | |
| 5,378,943 A | 1/1995 | Dennard | 326/68 |
| 5,434,717 A | 7/1995 | Yoshinaga et al. | 360/46 |
| 5,751,179 A | 5/1998 | Pietruszynski et al. | 327/379 |
| 5,892,371 A | 4/1999 | Maley | 326/81 |
| 5,926,056 A | 7/1999 | Morris et al. | 327/333 |
| 6,018,257 A | 1/2000 | Hung et al. | 327/112 |
| 6,052,017 A | 4/2000 | Pidutti et al. | |
| 6,054,888 A | 4/2000 | Maley | 327/333 |
| 6,081,152 A | 6/2000 | Maley | 327/320 |
| 6,121,800 A | 9/2000 | Leighton et al. | |
| 6,201,421 B1 | 3/2001 | Takeuchi et al. | 327/110 |
| 6,236,246 B1 | 5/2001 | Leighton et al. | 327/110 |
| 6,252,450 B1 | 6/2001 | Patti et al. | 327/424 |

OTHER PUBLICATIONS

Alini U.S. Application 09/651,561.

* cited by examiner

*Primary Examiner*—Regina N. Holder
(74) *Attorney, Agent, or Firm*—Lisa K. Jorgenson; Andre Szuwalski

(57) ABSTRACT

A method is disclosed for controlling the write head of a magnetic disk storage device. The method includes sinking current from the first terminal of the write head and sourcing current to the second terminal of the write head substantially simultaneously with sinking current from the first terminal so that a first steady state voltage level appears on the first terminal of the write head and a second steady state voltage level appears on the second terminal thereof that are approximately at a midpoint between a high reference voltage level and a low reference voltage level. The common mode voltage of the write head is substantially constant over time.

22 Claims, 3 Drawing Sheets

METHOD FOR DIFFERENTIALLY WRITING TO A MEMORY DISK

CROSS REFERENCE TO RELATED APPLICATION

This application is related to an application entitled "Write Head Driver Circuit and Method for Writing To A Memory Disk" (Ser. No. 09/651,561), filed Aug. 30, 2000. The application is incorporated by reference herein.

BACKGROUND OF THE INVENTION

Description of the Related Art

The present invention relates to a method for writing to a memory disk, and particularly to a method for controlling the write head of a disk drive device.

Most computer systems include one or more associated disk drives, which may be built into or external to the computer system. Typically, disk drives have at least one rotating magnetic medium and associated head mechanisms that are carried adjacent the magnetic material. The heads are radially positionable to selectively write information to, or read information from, precise positions on the disk medium. Such disk drives may be, for example, hard disk drives, floppy drives, or the like.

Data is written to the associated data disk by applying a series of signals to a write head according to the digital information to be stored on the magnetic disk media. The write head has a coil and one or more associated pole pieces that are located in close proximity to the disk media. As signals cause the magnetic flux to change in the head, the magnetic domains of the magnetic media of the disk are aligned in predetermined directions for subsequent read operations. Typically, a small space of unaligned magnetic media separates each magnetic domain transition to enable successive transitions on the magnetic media to be distinguished from each other.

Since the disk is moving relative to the head, it can be seen that if the small space separating the magnetic domain transitions is not sufficiently wide, difficulty may be encountered in distinguishing successive magnetic transitions. This may result in errors in reading the data contained on the disk, which is, of course, undesirable.

Meanwhile, as computers are becoming faster, it is becoming increasingly important to increase the speed at which data can be written to and read from the disk media. However, since the data signals are in the form of square wave transitions, if the rise time of the leading edges of the square waves is large, the small space between magnetic media transitions also becomes large, which reduces the effective rate at which data can be accurately written and read. Since the write head assembly includes at least one coil, forcing the current to rise rapidly, or to reverse flux directions within the write head is difficult.

In the past, data writing circuits and/or write drive circuits used to supply such write signals to the heads included preamplifier circuits to drive the current through selected legs of an "H-bridge" circuit, which is capable of allowing relatively fast current reversals for accurate data reproduction.

An example of a typical H-bridge write head drive circuit 10, according to the prior art, is shown in FIG. 1. The circuit 10 includes four MOS transistors, 12–15 connected between a high reference voltage $V_{dd}$ and a low reference voltage Vss at line 17. A coil 19, used, for example, to supply data pulses for writing to a disk drive media is integrated into the write head mechanism. The coil 19 is connected between the center legs of the H-bridge, as shown.

It can been seen that, depending on the gate biases applied to the respective transistors 12–15, the current flows through the coil 19 in one direction or another. That is, one current flow path includes the transistor 14, coil 19 from right to left, and transistor 13. The other current flow path includes transistor 12, the coil 19 from left to right, and the transistor 15.

In the H-bridge circuit 10, the transistors 12 and 14 serve as switching transistors, which are controlled by the out-of-phase signals on a pair of respective input lines 28 and 29. The transistors 13 and 15 serve as current controlling transistors, which are controlled by the out-of-phase signals on the respective input lines 29 and 28 in a manner opposite from the connections to the switching transistors 12 and 14, via respective control transistors 31 and 32. The magnitude of the current through the transistors 13 and 15 is controlled by a transistor 21, with which the transistors 13 and 15 form respective current mirrors, when connected via respective transmission gates 24 and 25. The transmission gates 24 and 25 are controlled by the signals on the respective input lines 29 and 28, in the same manner as the associated transistors 31 and 32. A reference current source 26 supplies the reference current to the transistor 21, which is mirrored by currents in respective transistors 13 and 15, as described above. In conventional driver circuits for controlling the write head of a disk drive, the steady state voltage levels to which the two terminals of write head 19 settle are both typically near either the high reference voltage level Vdd or the low reference voltage level Vss.

One problem encountered in disk drives employing existing drive circuitry for the write head coil 19 is that the wires or lines connecting the write head coil 19 to the write drive circuitry are located proximally to the wires or lines connecting the read head to the read channel circuitry (not shown in FIG. 1). The close proximity between the wires capacitively couples the wires together. As a result, voltage spikes or other voltage transitions appearing on the lines connected to write head coil 19 may have a greater tendency to appear as noise on the lines connected to the read head of the disk drive and potentially damage the read head as a result. In addition to the capacitive coupling between the lines associated with the write head, a significant degree of coupling within the structure of the write head itself may disadvantageously occur.

Because of the inductive nature of the write head coil 19 and because conventional steady state voltage levels for the write head terminals are approximately near the high reference voltage level Vdd, a relatively sizeable voltage spike or undershoot typically may be generated on a terminal of write head 19 (the terminal of write head 19 having a voltage signal experiencing a falling transition) during the time that the current passing through write head 19 transitions from one direction to another. In other words, a relatively sizeable voltage spike appears on a terminal of the write head when the write head transitions between steady states. FIG. 2 shows a plot of the voltage appearing on each terminal of a write head during the reversal of current flow through a write head using existing write head drive techniques. As can be seen, a relatively sizeable voltage spike or undershoot may be capacitively coupled to the lines associated with the read head of the disk drive and thereby damage the read head.

During the time the direction of current flow in the write head transitions (i.e., during the time between steady state conditions), the common mode voltage at the write head is different from the common mode voltage at the write head during steady state conditions. This can be seen in FIG. 2, where the common mode voltage of the write head during the time the direction of current flow therein transitions (around time 0.5 ns) is noticeably less than the common mode voltage of the write head during steady state conditions (after time 2 ns).

As data rates increase, the rates at which the heads can accurately write the data to the magnetic media is limited by the speed at which the flux in the coil 19 (and its associated components) can be reversed. Relatedly, the amplitude of voltage spikes appearing on a write head terminal (and coupled current appearing on the corresponding read head terminals) is based in part upon the rate of flux reversal. The maximum data rate is thus limited to the maximum physical flux reversal rate of the write head drive circuitry and the maximum allowable coupled current that may be tolerated at the read head during the period of flux reversal.

What is needed, therefore, is a method for driving an inductive load of the type used in conjunction with a write head of a disk drive with a signal that enables a maximum flux reversal rate in the driver coil in an absence of an appreciable amount of coupled current on lines capacitively coupled to the inductive load.

SUMMARY OF THE INVENTION

The present invention overcomes the shortcomings in prior systems and satisfies a significant need for a method of controlling an inductive load, such as the write head of a disk drive or other disk storage device. When utilized in conjunction with or as part of a disk drive, the method provides a current to the write head so that current flows through the write head in one direction or the other.

In order to reduce the amount of noise appearing on the lines for the read head due to capacitive coupling to the lines driving the write head, current is passed through the write head so that the steady state voltage levels of the write head terminals are approximately at a midpoint between a high reference voltage level and a low reference voltage level. In this way, a voltage spike or undershoot/overshoot appears on each write head terminal during the time current flowing through the write head changes direction, instead of appearing primarily on a single write head terminal. The capacitive coupling effect on each read head line due to the voltage spikes appearing on one write head terminal cancels the capacitive coupling effect due to the voltage spikes appearing on the other write head terminal. As a result, the cumulative effect of the voltage spikes on the read head terminals is substantially reduced.

In this way, the time associated with reversing current through the write head may be substantially minimized without experiencing substantial current overshoot or undershoot relative to the desired destination current level and without creating an appreciable level of noise elsewhere in the disk drive system.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown.

Figure 1:
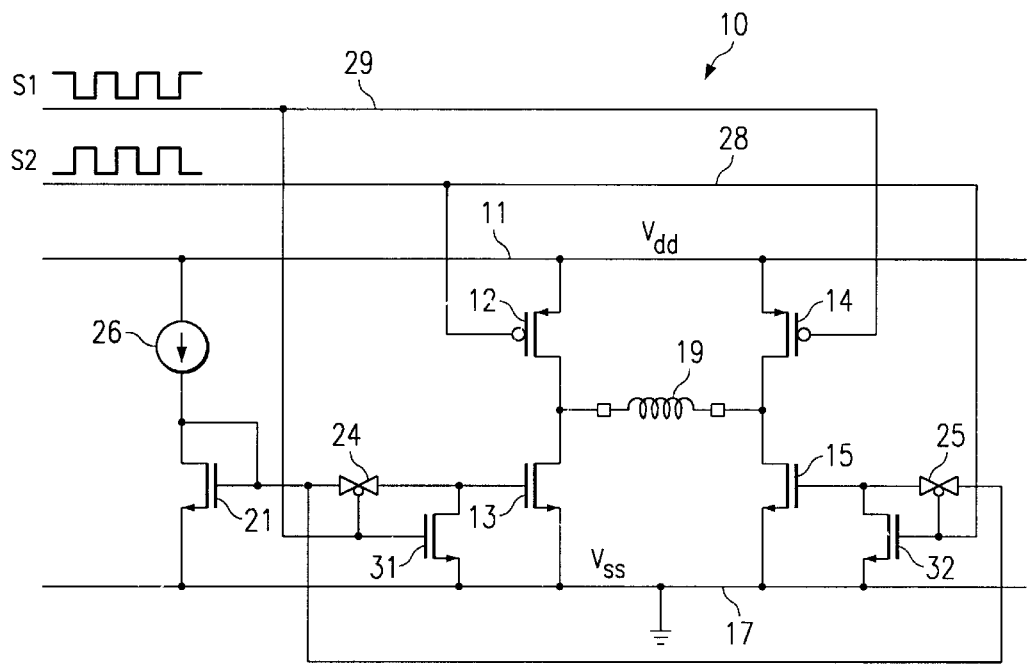
FIG. 1 illustrates a schematic diagram of a conventional H-bridge driver circuit for a write head of a disk storage device, as described above.
Figure 2:
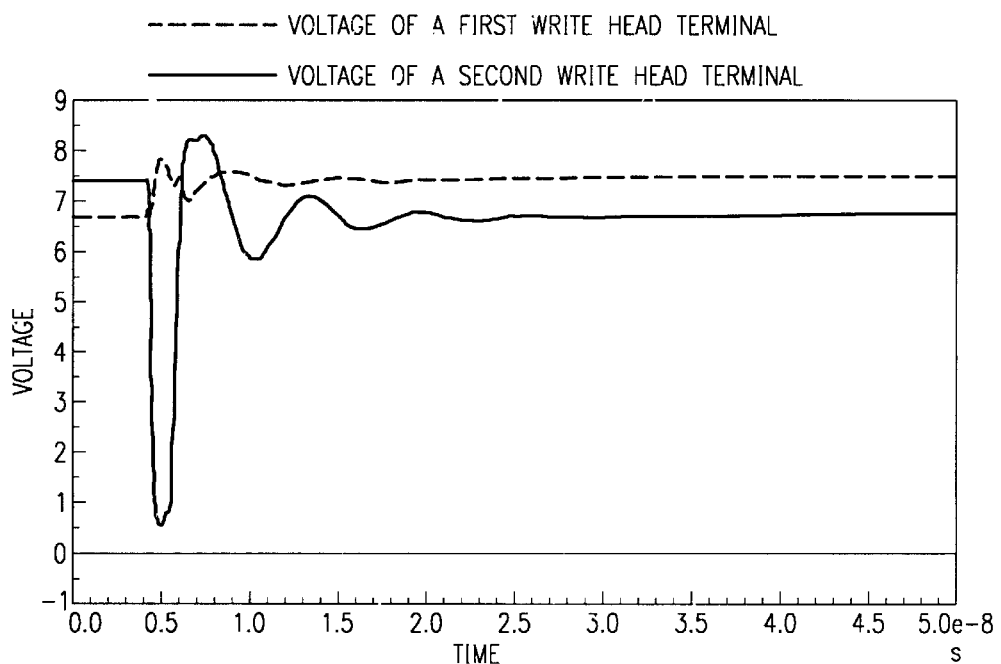
FIG. 2 is a plot of the voltage appearing on the terminals of a write head of a disk drive using existing drive methods for controlling the write head.
Figure 3:
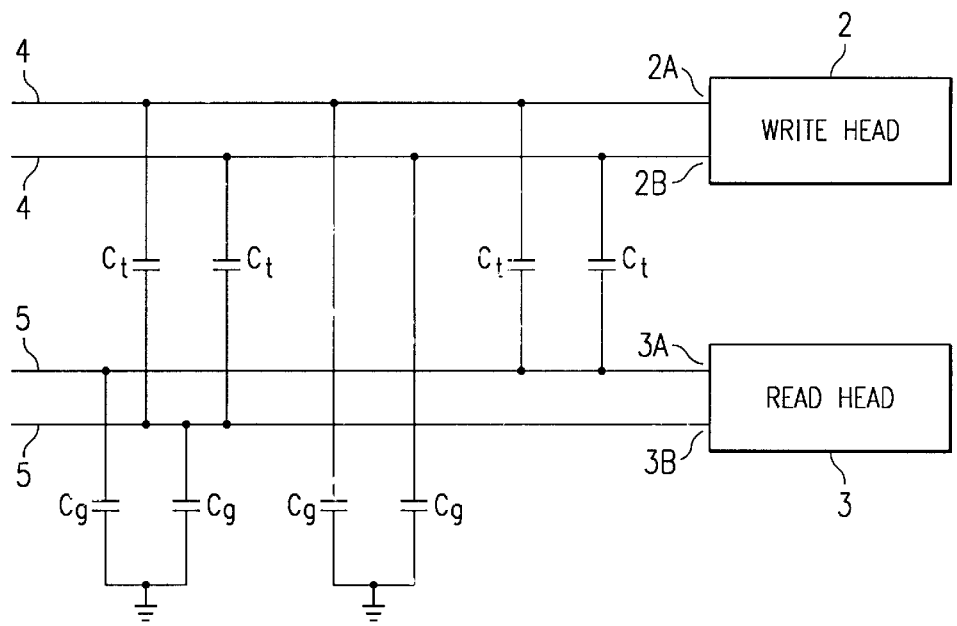
FIG. 3 is a diagram showing a capacitive coupling relationship between a write head and a read head of a disk drive.

Referring to FIG. 3, the disk drive 1 includes a write head 2 having a first terminal 2A and a second terminal 2B. The disk drive 1 further includes a read head 3 having a first terminal 3A and a second terminal 3B. A preamplifier circuit (not shown) includes output signals connected to the first and second terminals of write head 2 via write head lines 4, and input signals connected to the first and second terminals of read head 3 via read head lines 5. Due to the close proximity between write head lines 4 and read head lines 5, read head lines 5 are directly capacitively coupled to write head lines 4. The direct capacitive coupling between write head lines 4 and read head lines 5 is represented as capacitors $C_t$.

It is understood that write head lines 4 may be capacitively coupled to other signal lines within a disk drive besides read head lines 5. For example, a ground plane A may be disposed in proximity to write head lines 4 and read head lines 5 and capacitively coupled thereto as a result. The capacitive coupling between write head lines 4 and ground plane A and between read head lines 5 and ground plane A is represented in FIG. 3 by capacitors $C_g$. As can be seen, read head lines 5 are indirectly coupled to write head lines 4 due to the presence of capacitors $C_g$.

An embodiment of the present invention is directed to controlling write head 2 of disk drive 1 so that data may be written to a disk (not shown) at relatively high speeds while simultaneously reducing capacitively coupled noise levels on read head lines 5 and elsewhere. In this way, the embodiment of the present invention supports relatively high density data storage.

The embodiment of the present invention differentially drives first and second terminals of write head 2 so that current is passed through write head 2 in either direction. Instead of driving the first and second terminals of write head 2 so that the steady state voltage levels of the first and second terminals of the write head 2 are at approximately the high reference voltage level, the first and second terminals are driven so as to settle approximately around a midpoint between a high reference voltage level and the low reference voltage level (the "midpoint voltage"). In other words, the first and second terminals of write head 2 are driven so that a common mode voltage level of the first and second terminals of write head 2 is at approximately the midpoint voltage. With the steady state voltage swing of the first and second terminals of the write head being substantially the same as in prior drive methods, the steady state voltage levels of the first and second terminals of write head 2 are around the midpoint voltage. According to the embodiment of the present invention, a high steady state voltage level is slightly above the midpoint voltage and a low steady state voltage level is slightly below the midpoint voltage. It is understood, however, that both the high and low steady state voltage levels may be slightly above the midpoint voltage. Alternatively, it is understood that both the high and low steady state voltage levels may be slightly below the midpoint voltage.

Figure 4:
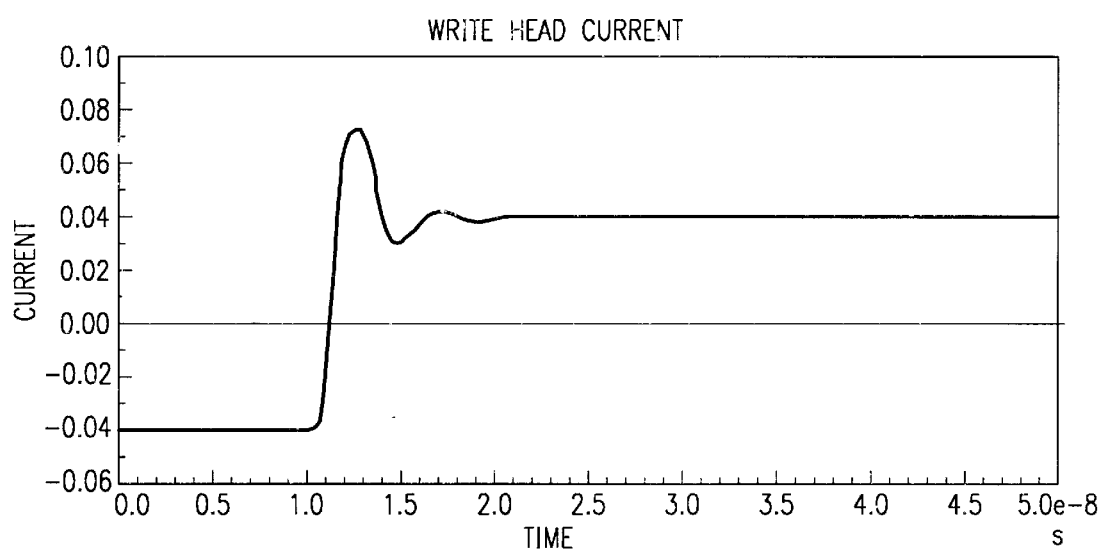
FIG. 4 is a plot of the current flowing through a write head of a disk drive using a drive method according to an embodiment of the present invention.
Figure 5:
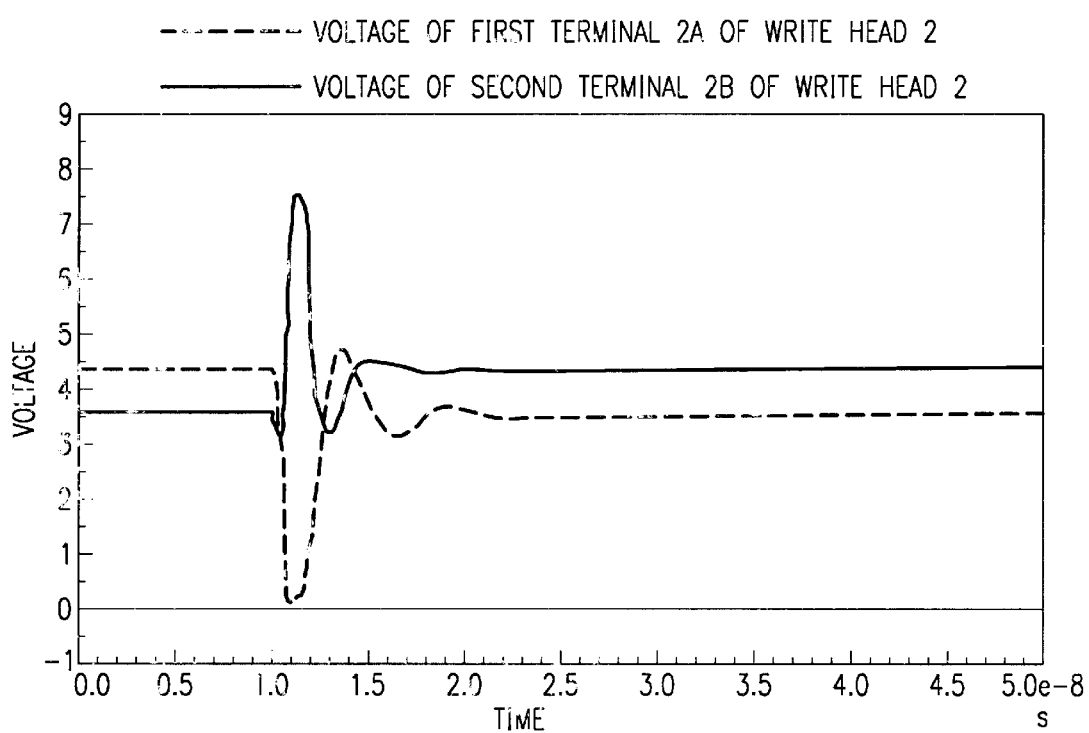
FIG. 5 is a plot of the voltage appearing at the terminals of a write head of a disk drive using the drive method according to an embodiment of the present invention.

The operation of the embodiment of the present invention will be described with reference to FIGS. 4 and 5. The present method will be described for the case in which current initially flows through write head 2 in a first direction and then is reversed so as to flow in a second direction, for exemplary purposes only. It is understood that the present method operates similarly for the opposite case in which current initially flows through write head 2 in the second direction and is subsequently reversed so as to flow in the first direction. FIGS. 4 and 5 are plots of measured current and voltage levels, respectively, of write head 2 during the time the direction of current flowing through write head 2 is reversed.

Initially, a negative steady state current level flows through write head 2. This is accomplished by sourcing current to write head 2 through first terminal 2A and sinking current from write head 2 through second terminal 2B. First terminal 2A of write head 2 is at a high steady state voltage level, which is approximately 4.4 v. Second terminal 2B of write head 2 is at a low steady state voltage level, which is approximately 3.6 v. In this exemplary operation, the high reference voltage level is 8.0 v and the low reference voltage level is ground (0 v), so the midpoint (common mode) voltage is 4.0 v.

At approximately time 10ns, the direction of current flow through write head 2 is reversed by sinking current from write head 2 through first terminal 2A and sourcing current to write head 2 through second terminal 2B. Because of the inductive nature of write head 2 and because the steady state voltage levels of the write head terminals are around the midpoint voltage, a voltage spike or overshoot/undershoot appears on both first terminal 2A and second terminal 2B of write head 2. As can be seen in FIG. 5, a voltage undershoot and/or negative voltage spike appears on first terminal 2A and a voltage overshoot and/or positive voltage spike appears on second terminal 2B. Further, the amplitude of the voltage undershoot on first terminal 2A is approximately the same as the amplitude of the voltage overshoot on second terminal 2B. Still further, the voltage undershoot and overshoot occur at substantially the same time. This results in the common mode voltage of write head 2 during the time of current reversal to be substantially the same as or within a predetermined range from the common mode voltage of write head 2 during steady state conditions. In other words, the common mode voltage is substantially constant. The voltages appearing on first terminal 2A and second terminal 2B eventually settle at the low and high steady state voltage levels, respectively.

Because the voltage undershoot on first terminal 2A is approximately the same size and occurs at approximately the same time as the voltage overshoot on second terminal 2B, the capacitively coupled voltage appearing on a read head line 5, ground plane A and other signal lines in proximity to write head lines 4 due to the voltage undershoot (on write head terminal 2A) is substantially offset or canceled out by the capacitively coupled voltage appearing on read head line 5 due to the voltage overshoot (on write head terminal 2B). Consequently, noise appearing on read head lines 5 and elsewhere are substantially reduced.

As explained above, the embodiment of the present invention is a method for controlling the write head of a disk drive. It is understood that a circuit implementation may be associated with the above-described method. Such a circuit implementation is described in related application entitled "Write Head Driver Circuit and Method for Writing to a Memory Disk", Ser. No. 09/651,561, filed Aug. 30, 2000 and incorporated herein by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling the write head of a disk drive, the write head including a first terminal and a second terminal, the method comprising the steps of:

sinking current from the first terminal of the write head; and sourcing current to the second terminal of the write head substantially simultaneously with the step of sinking current from the first terminal so that a first steady state voltage level appears on the first terminal and a second steady state voltage level appears on the second terminal that are approximately at a midpoint between a high reference voltage level and a low reference voltage level.

2. The method of claim 1, further comprising the steps of:

sinking current from the second terminal of the write head following the steps of sinking current from the first terminal and sourcing current to the second terminal; and sourcing current to the first terminal during the step of sinking current from the second terminal so that a voltage spike produced on the first terminal and a voltage spike produced on the second terminal occur at substantially the same time and have opposite polarity.

3. The method of claim 2, wherein:

the voltage spike on the first terminal and the voltage spike on the second terminal have substantially the same amplitude.

4. The method of claim 1, further comprising:

sinking current from the second terminal of the write head following the steps of sinking current from the first terminal and sourcing current to the second terminal; and sourcing current to the first terminal during the step of sinking current from the second terminal so that a voltage spike produced on the first terminal and a voltage spike produced on the second terminal have opposite polarity and substantially the same amplitude.

5. The method of claim 4, wherein:

the voltage spike on the first terminal and the voltage spike on the second terminal occur at substantially the same time.

6. The method of claim 1, wherein:

a first one of the first and second steady state voltage levels is relatively slightly greater than the midpoint; and a second one of the first and second steady state voltage levels is relatively slightly less than the midpoint.

7. In a disk drive including a write head having a first and a second write head terminal and a read head capacitively coupled to the first and second write head terminals, a method of passing current through the write head representative of data bit values, the method comprising the step of:

differentially driving the first and second write head terminals so that one or more voltage spikes appearing on the first and second write head terminals during reversals of current flow through the write head are substantially canceled at the read head, and that a first steady state voltage level appears on the first write head terminal and a second steady state voltage level appears on the second terminal, the first and second steady state voltage levels being approximately at a midpoint between a high reference voltage level and a low reference voltage level.

8. The method of claim 7, wherein:

the step of differentially driving comprises the step of setting a common mode voltage level of the first and second write head terminals to approximately a midpoint between a high reference voltage level and a low reference voltage level.

9. The method of claim 8, wherein:

the step of differentially driving comprises driving a first one of the first and second write head terminals to a voltage level greater than the midpoint between a high reference voltage level and a low reference voltage level, and driving a second one of the first and second write head terminals to a voltage level less than the midpoint between a high reference voltage level and a low reference voltage level.

10. The method of claim 9, wherein:

voltage spikes appearing on the first write head terminal during reversals of current flow through the write head are of opposite polarity to voltage spikes appearing on the second write head terminal during the reversals of current flow through the write head.

11. The method of claim 10, wherein:

the voltage spikes appearing on the first write head terminal occur at substantially the same time as the voltage spikes appearing on the second write head terminal during the reversals of current flow through the write head.

12. The method claim 10, wherein:

the voltage spikes appearing on the first write head terminal during the reversals of current flow through the write head have substantially the same amplitude of the voltage spikes appearing on the second write head terminal.

13. The method of claim 7, wherein the step of differentially driving comprises:

differentially driving the first and second write head terminals so that the common mode voltage of the write head is substantially constant.

14. The method of claim 7, wherein the step of differentially driving comprises:

differentially driving the first and second write head terminals so that the steady state voltage levels thereof are approximately around 4.0 v.

15. A method of controlling the write head of a disk drive having a read head capacitively coupled to the write head, the write head including a first terminal and a second terminal, the method comprising:

passing current through the write head so that current flows in a first direction and the voltage appearing on the first and second terminals of the write head reach predetermined steady state voltage levels; and reversing current flow through the write head so that current flows in a second direction, the voltage appearing on the first and second terminals of the write head settle at the predetermined steady state voltage levels and the common mode voltage of the write head is substantially constant, the predetermined steady state voltage levels being approximately at a midpoint between a high reference voltage level and a low reference voltage level.

16. The method of claim 15, wherein:

the predetermined steady state voltage levels comprise a first steady state voltage level that is greater than the midpoint between the high reference voltage level and the low reference voltage level.

17. The method of claim 16, wherein:

the predetermined second steady state voltage levels further comprise a second steady state voltage level that is less than the midpoint between the high reference voltage level and the low reference voltage level.

18. The method of claim 15, wherein:

capacitive coupling effects from voltage overshoot and undershoot appearing on the first and second terminals of the write head during reversal of current flow through the write head are substantially canceled at the read head.

19. The method of claim 18, wherein:

an amplitude of a voltage overshoot appearing on the first terminal of the write head is substantially the same as the amplitude of a voltage undershoot appearing on the second terminal of the write head.

20. The method of claim 18, wherein:

an amplitude of a voltage undershoot appearing on the first terminal of the write head is substantially the same as the amplitude of a voltage overshoot appearing on the second terminal of the write head.

21. The method of claim 20, wherein:

the voltage undershoot appearing on the first terminal of the write head occurs at substantially the same time as the voltage overshoot appearing on the second terminal of the write head.

22. The method of claim 15, wherein:

the predetermined steady state voltage levels are approximately around 4.0 v.

* * * * *

UNITED STATES PATENT AND TRADEMARK OFFICE
CERTIFICATE OF CORRECTION

PATENT NO.     : 6,512,649 B1
DATED          : January 28, 2003
INVENTOR(S)    : Alini et al.

It is certified that error appears in the above-identified patent and that said Letters Patent is hereby corrected as shown below:

<u>Column 7,</u>
Line 17, replace "approximately a" with -- approximately the --
Lines 18, 23 and 27, replace "between a high" with -- between the high --
Lines 18 and 24, replace "and a low" with -- and the low --
Line 27, replace "level and a" with -- level and the --

Signed and Sealed this

Second Day of December, 2003

JAMES E. ROGAN
*Director of the United States Patent and Trademark Office*